(12) United States Patent
Brendl et al.

(10) Patent No.: US 10,641,362 B2
(45) Date of Patent: May 5, 2020

(54) GEAR ASSEMBLY

(71) Applicant: Magna Powertrain GmbH & Co KG, Lannach (AT)

(72) Inventors: Werner Brendl, Allerheiligen bei Wildon (AT); Gerhard Hofer, Pinggau (AT); Klaus Nenninger, Perg (AT); Peter Pisek, Leitring (AT); Manfred Rahm, Eisbach-Rein (AT); Jan Wiechmann, Neutillmitsch (AT); Hansdieter Wiedner, Vorau (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 56 days.

(21) Appl. No.: 16/060,076

(22) PCT Filed: Dec. 2, 2016

(86) PCT No.: PCT/EP2016/079598
§ 371 (c)(1),
(2) Date: Jun. 7, 2018

(87) PCT Pub. No.: WO2017/097678
PCT Pub. Date: Jun. 15, 2017

(65) Prior Publication Data
US 2018/0363738 A1   Dec. 20, 2018

(30) Foreign Application Priority Data

Dec. 11, 2015 (DE) .................. 10 2015 225 001
Dec. 11, 2015 (DE) .................. 10 2015 225 002
Dec. 18, 2015 (DE) .................. 10 2015 225 943

(51) Int. Cl.
*B60K 23/04* (2006.01)
*F16H 3/72* (2006.01)
(Continued)

(52) U.S. Cl.
CPC ............... *F16H 3/724* (2013.01); *B60K 1/00* (2013.01); *B60K 6/48* (2013.01); *B60K 6/52* (2013.01);
(Continued)

(58) Field of Classification Search
CPC .. F16H 3/724; B60K 1/00; B60K 6/48; B60K 6/54; B60K 17/35; B60K 17/354;
(Continued)

(56) References Cited

U.S. PATENT DOCUMENTS 707,230 A    8/1902  Henry et al.
4,423,794 A  1/1984  Beck
(Continued)

FOREIGN PATENT DOCUMENTS

DE   102008061367 A1   7/2009
DE   102011004410 A1   8/2012
(Continued)

OTHER PUBLICATIONS

International Search Report and Written Opinion dated Feb. 21, 2017 from International Patent Application Serial No. PCT/EP2016/079598.

*Primary Examiner* — Leslie A Nicholson, III
(74) *Attorney, Agent, or Firm* — Dickinson Wright PLLC

(57) ABSTRACT

A transmission arrangement (1) for the controllable distribution of drive torque from an input element (2) to at least one output element (3), comprising a first transmission part region (4), namely a planetary gear mechanism, and an additional drive unit (5), the first transmission part region (4) being drive-connected directly or indirectly to the input element (2) and to the additional drive unit (5), and the first transmission part region (4) being drive-connected directly or indirectly to the output element (3).

7 Claims, 4 Drawing Sheets

Figure 1:
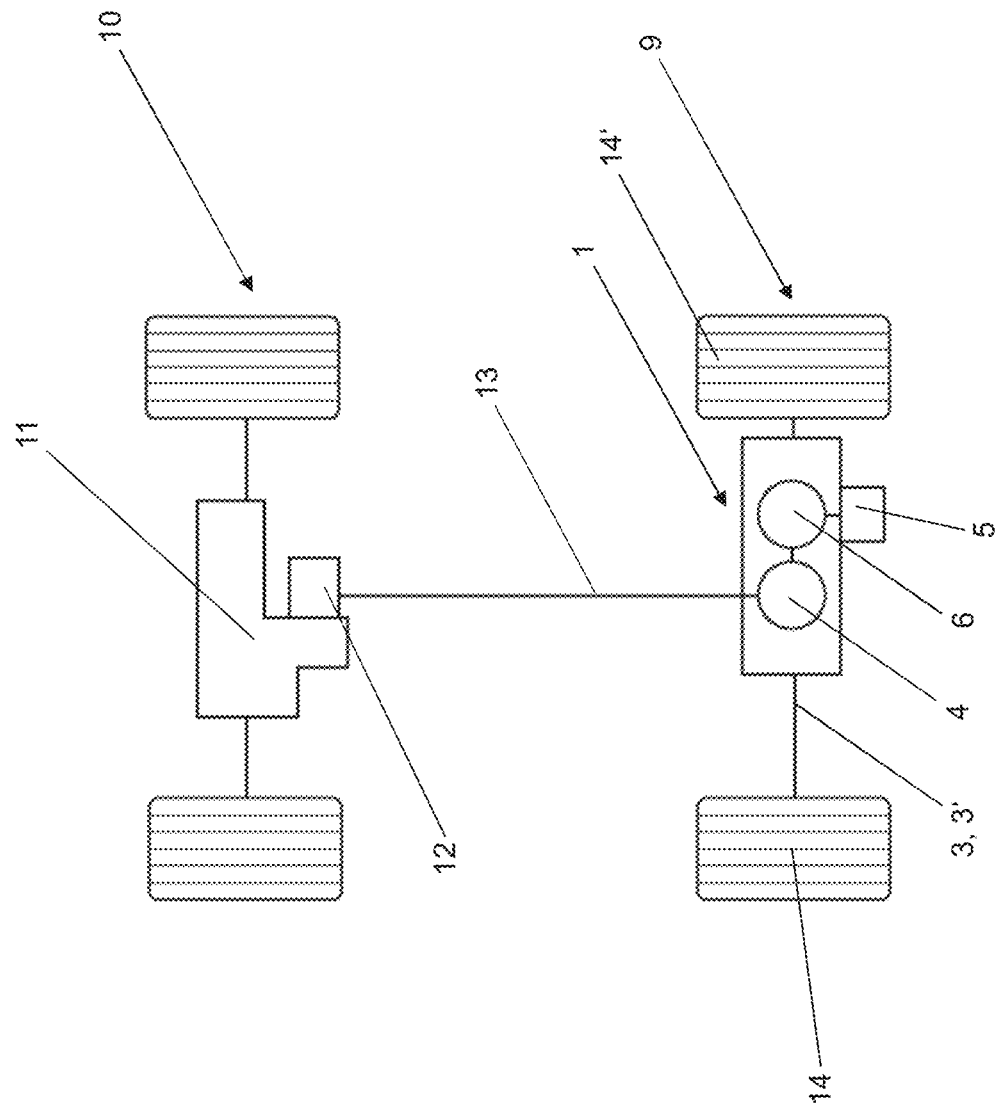

(51) Int. Cl.
*B60K 17/354* (2006.01)
*B60K 17/356* (2006.01)
*B60K 23/08* (2006.01)
*B60K 17/35* (2006.01)
*B60K 6/48* (2007.10)
*B60K 6/52* (2007.10)
*B60K 1/00* (2006.01)
*B60K 6/54* (2007.10)

(52) U.S. Cl.
CPC ............... *B60K 6/54* (2013.01); *B60K 17/35* (2013.01); *B60K 17/354* (2013.01); *B60K 17/356* (2013.01); *B60K 23/04* (2013.01); *B60K 23/0808* (2013.01); *B60K 2001/001* (2013.01); *B60K 2006/4808* (2013.01); *B60K 2023/0833* (2013.01); *B60Y 2400/73* (2013.01)

(58) Field of Classification Search
CPC .. B60K 17/356; B60K 23/04; B60K 23/0808; B60K 2001/001; B60K 2006/4808; B60K 2023/0833; B60Y 2400/73

USPC ........................................................... 475/5
See application file for complete search history.

(56) References Cited

U.S. PATENT DOCUMENTS 5,433,282 A    7/1995   Moroto et al.
7,871,348 B2 *   1/2011   Perkins ................. B60K 6/442
                                                            475/5

FOREIGN PATENT DOCUMENTS

EP       1541895 A2    6/2005
EP       2639091 A1    9/2013
KR    20090000341 A    1/2009
WO   WO2014033137 A1    3/2014

* cited by examiner

GEAR ASSEMBLY

CROSS-REFERENCE TO RELATED APPLICATIONS

This application is a National Stage of International Application No. PCT/EP2016/079598, filed Dec. 2, 2016, which claims the benefit and priority of German Patent Application Nos. DE 10 2015 225 001.6 filed Dec. 11, 2015, DE 10 2015 225 002.4 filed Dec. 11, 2015 and DE 10 2015 225 943.9 filed Dec. 18, 2015. The entire disclosures of each of the above applications are incorporated herein by reference.

TECHNICAL FIELD

The present invention relates to a transmission arrangement for the controllable distribution of drive torque from an input element to at least one output element, comprising a first transmission part region and an additional drive unit, the first transmission part region being drive-connected directly or indirectly to the input element and to the additional drive unit, and the first transmission part region being drive-connected directly or indirectly to the output element.

BACKGROUND

All-wheel-drive motor vehicles are the subject of continuous development, inter alia on account of the increased fuel consumption and the increasing requirements in respect of exhaust gas regulations. In this context, in particular, the at least partial electrification of the motor vehicle or the motor vehicle drive train is paramount;

the at least partial hybridization of the motor vehicle or the motor vehicle drive establishes the balancing act between a reduced fuel consumption, a sufficient range and satisfactory performance.

In the case of an all-wheel-drive motor vehicle with a transverse main drive unit which lies at the front, namely an internal combustion engine, for example, an all-wheel-drive system is required which makes a variable all-wheel-drive function possible. Here, the primary axle, that is to say the permanently driven axle, is the front axle, and the secondary axle, that is to say the axle which is not driven permanently, is the rear axle. The rear axle should be capable of being switched in in a fully variable manner according to requirements with consideration of the requirement for a variable all-wheel-drive function, and should offer the possibility of transmitting the entire available torque in a variable manner via the secondary axle, namely the rear axle. At the same time, functions such as brake force recuperation, boosting, that is to say accelerating the vehicle by way of positive drive torques both from the internal combustion engine and from an additional drive unit, such as an electric machine, and purely electric driving are possibly to be made possible. Thus, for example, an electric rear axle in addition to the transversely installed front main drive unit with a permanent front axle drive makes recuperation, boosting and purely electric driving possible. Furthermore, the electrification of the secondary axle (the rear axle in the example which is mentioned) makes it possible to dispense with a conventional all-wheel-drive clutch, in order to transmit the drive torque in a variable manner to the secondary axle.

SUMMARY

It is an object of the invention to specify an improved transmission arrangement for the variable distribution of torque in an all-wheel-drive train of a motor vehicle.

The object is achieved by way of a transmission arrangement for the controllable distribution of drive torque from an input element to at least one output element, comprising a first transmission part region and an additional drive unit, the first transmission part region being drive-connected directly or indirectly to the input element and to the additional drive unit, and the first transmission part region being drive-connected directly or indirectly to the output element.

The transmission arrangement according to the invention serves for the controllable distribution of drive torque from an input element to at least one output element.

In accordance with the present invention, the transmission arrangement comprises a first transmission part region and an additional drive unit. According to the invention, the first transmission part region is firstly drive-connected directly or indirectly to the input element and the additional drive unit, and secondly is drive-connected directly or indirectly to the output element.

According to the invention, the first transmission part region is configured as a planetary gear mechanism.

The additional drive unit can be configured, for example, as an electric machine.

The configuration according to the invention of the transmission arrangement makes fully variable control of the torque which is transmitted at the output element possible; here, the torque is controlled via the supporting torque which is provided by the additional drive unit. In relation to a conventional all-wheel-drive train of a motor vehicle, this necessitates dispensing with a conventional all-wheel-drive clutch, as a result of which firstly installation space and costs can be saved.

Furthermore, functions such as boosting, recuperation and purely electric driving can be realized by way of the integration of the additional drive unit.

Developments of the invention are specified in the dependent claims, the description and the appended drawings.

In one preferred embodiment of the present invention, the first transmission part region, namely the planetary gear mechanism, is drive-connected to the output element indirectly via a second transmission part region, namely a differential transmission. The second transmission part region preferably has a differential cage, the differential cage configuring a planetary gear carrier of the first transmission part region. A differential transmission, namely the second transmission part region, and a superimposing transmission, namely the first transmission part region, are drive-coupled in this way. The attachment of the second transmission part region to the first transmission part region affords the advantage of the symmetrical distribution of torque both in the overrun mode and in the traction mode of an all-wheel-drive motor vehicle.

The second transmission part region, namely the differential transmission, can be configured, for example, as a bevel gear differential, a crown gear differential, a spur gear differential or else as a special differential.

The additional drive unit can be arranged offset in parallel with respect to the output element, or it can be arranged coaxially with respect to the output element. An arrangement of the additional drive unit offset at an angle with respect to the output element, that is to say offset in a non-parallel manner with respect to the output element, is also conceivable, however. The installation space in any desired all-wheel-drive motor vehicle architecture can be utilized in an optimum manner in this way.

The planetary gear mechanism is preferably configured as a multi-step planetary gear mechanism. Improved transmission ratios can thus be realized with the utilization of a small amount of installation space.

The transmission arrangement is preferably arranged on a secondary axle of an all-wheel-drive motor vehicle, the secondary axle being the output element.

DRAWINGS

Figure 2:
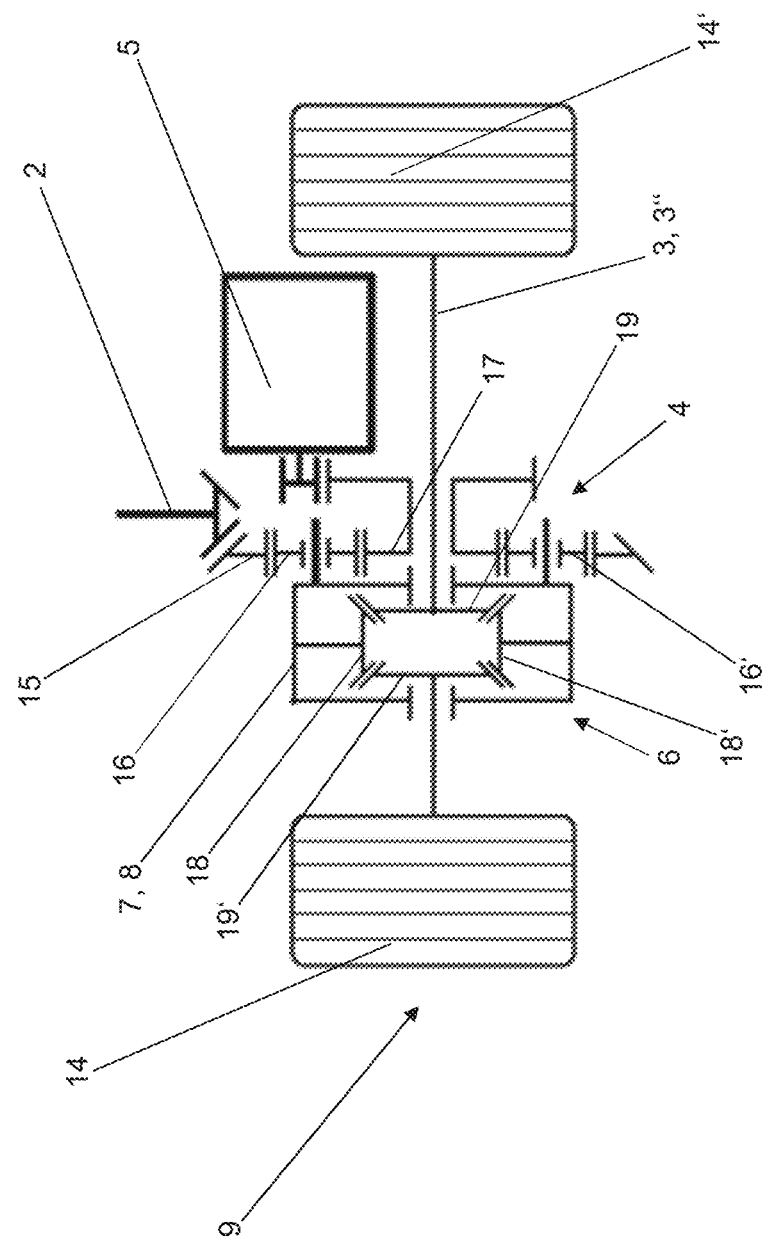
Figure 3:
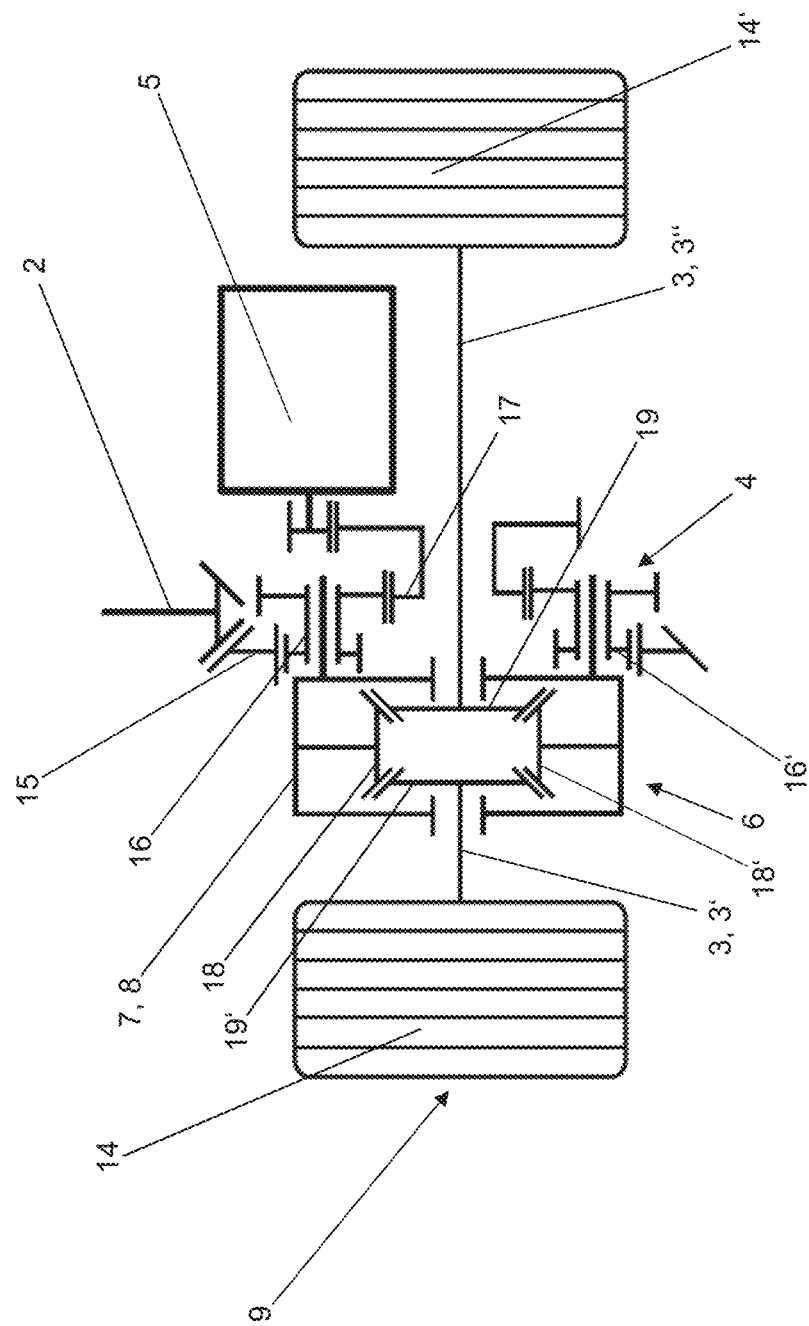
Figure 4:
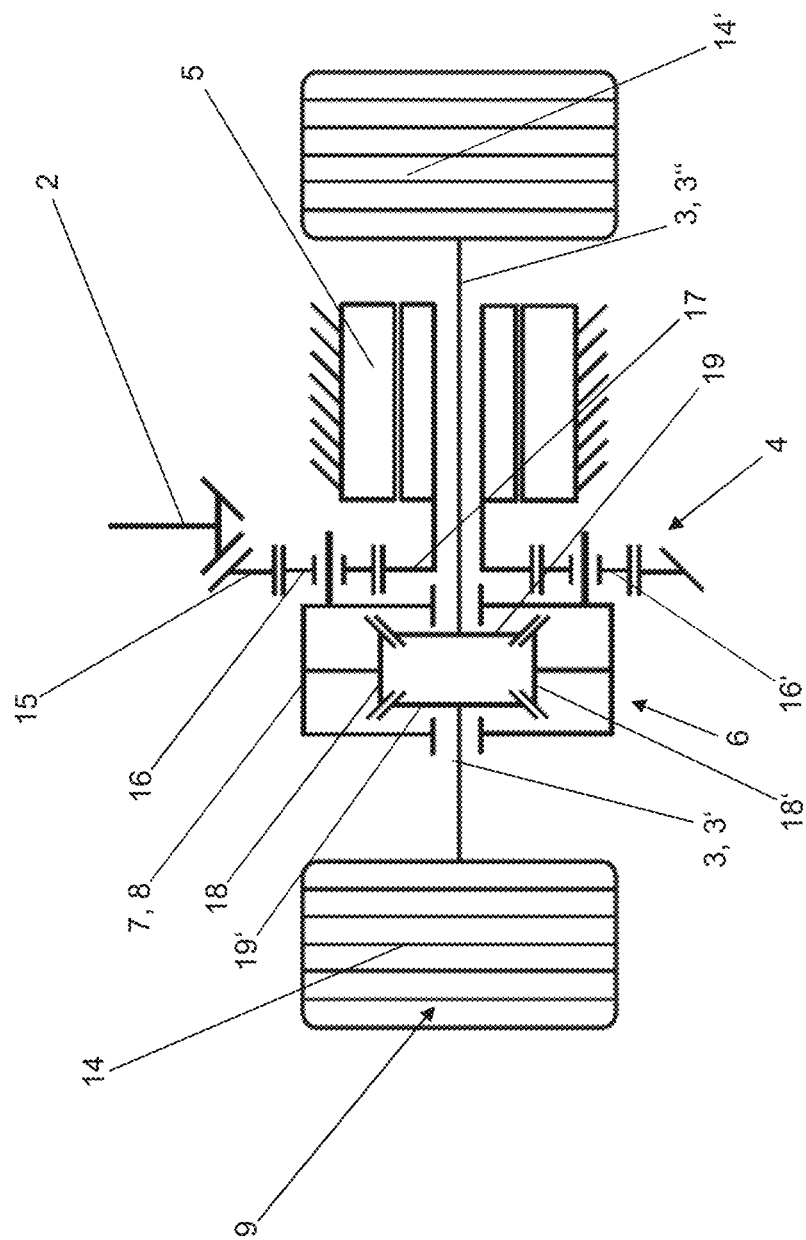

The invention will be described in the following text by way of example with reference to the drawings, in which:

FIG. 1 shows a fundamental architecture of an exemplary all-wheel-drive motor vehicle having a transmission arrangement according to the invention, FIG. 2 shows a diagrammatic illustration of one exemplary design variant of the transmission arrangement according to the invention, FIG. 3 shows a further diagrammatic illustration of one exemplary design variant of the transmission arrangement according to the invention, and FIG. 4 shows a third diagrammatic illustration of one exemplary design variant of the transmission arrangement according to the invention.

DESCRIPTION

FIG. 1 shows a diagrammatic view of an exemplary all-wheel-drive motor vehicle architecture having a transmission arrangement 1 according to the invention. The motor vehicle drive takes place via two axles, namely a front axle 10 and a rear axle 9, the front axle 10 being configured as a permanently driven axle, that is to say as a primary axle, and the rear axle 9 being configured as an axle which is driven if required, that is to say as a secondary axle. In the region of the front axle 10, a main drive unit 11 is arranged transversely with respect to the driving direction in the present exemplary embodiment. In this context, an arrangement of the main drive unit 11 longitudinally with respect to the driving direction is also conceivable, however. The transmission arrangement 1 according to the invention is arranged in the region of the rear axle 9. The main drive unit 11 is configured as an internal combustion engine and is connected directly or indirectly to the transmission arrangement 1 at the rear axle 9 via a main transmission 12 and a torque-transmitting element 13, namely a prop shaft.

In the following text, the transmission arrangement 1 according to the invention will be described in greater detail with reference to the all-wheel-drive motor vehicle architecture which is shown in FIG. 1. All-wheel-drive motor vehicle architectures of a different design having a transmission arrangement according to the invention are likewise conceivable, however.

FIG. 2 shows an exemplary transmission arrangement 1 which has a first transmission part region 4, a second transmission part region 6 and an additional drive unit 5.

The additional drive unit 5 of the transmission arrangement 1 is configured as an electric machine and can either be arranged offset in parallel with respect to the rear axle 9 (FIG. 2, FIG. 3) or coaxially on the rear axle 9 (FIG. 4).

The first transmission part region 4 is configured as a planetary gear mechanism and serves firstly for the summation of power and secondly for the variable distribution of torque between the front axle 10 and the rear axle 9 in the case of a selected all-wheel-drive function. The exemplary planetary gear mechanism which is shown diagrammatically in FIG. 2 and FIG. 4 comprises a rotatably mounted internal gear 15 with an external toothing system and an internal toothing system, a planetary gear carrier 8 with two planetary gears 16, 16' which are mounted rotatably thereon, and a sun gear 17. The use of a planetary gear mechanism of an alternative configuration is likewise conceivable, however; thus, for example, FIG. 3 shows an embodiment of the first transmission part region 4 as a multi-step planetary gear mechanism.

The second transmission part region 6 is configured as a differential transmission (also called a compensating transmission) and serves substantially to compensate for the rotational speeds between the two rear wheels 14, 14' of the motor vehicle and for the distribution of the drive torque between the two rear wheels 14, 14' of the rear axle 9 of the motor vehicle. The second transmission part region 6 which is shown in FIG. 2, FIG. 3 and FIG. 4 has a differential cage 7, two compensating bevel gears 18, 18' which are mounted rotatably on a pin, and two axle bevel gears 19, 19'. The compensating bevel gears 18, 18' are not drive-connected among one another, but are drive-connected in each case to the axle bevel gears 19, 19'. The axle bevel gears 19, 19' are connected fixedly in each case to one of the two half axles 3', 3" of the rear axle 9.

The first transmission part region 4 is firstly drive-connected directly to the input element 2, namely a continuation of the prop shaft, and indirectly, namely via a reduction gear (not shown), to the additional drive unit 5, and is secondly drive-connected indirectly, namely via the second transmission part region 6, to the two half axles 3', 3" of the rear axle 9.

The first transmission part region 4 therefore has three interfaces: two torque inputs, namely via the input element 2 and the additional drive unit 5, and a torque output, namely via the second transmission part region 6 and the output element 3, 3', 3".

The input element 2 is drive-connected directly or indirectly to the internal gear 15 of the first transmission part region 4. The additional drive unit 5 is drive-connected indirectly via a reduction gear (not shown) to the sun gear 17 of the first transmission part region 4.

The second transmission part region 6 is drive-connected via the differential cage 7 to the first transmission part region 4, the differential cage 7 configuring the planetary gear carrier 8 of the first transmission part region 4.

In the case of an additional drive unit 5 which is not switched in, no transmission of drive torque takes place from the main drive unit 11 to the two half axles 3', 3"; that is to say, in the case of an all-wheel-drive function which is not selected, no torque is transmitted to the rear axle 9.

The transmission of drive torque from the main drive unit 11 to the rear axle 9 and therefore the realization of the all-wheel-drive function take place only when the additional drive unit 5 is switched in, that is to say when the necessary supporting torque is provided via the sun gear 17 of the first transmission part region 4, which sun gear 17 is drive-connected to the additional drive unit 5. The electric machine provides the torque at the sun gear, which torque serves as a supporting torque. Said supporting torque controls the entire torque of the rear axle 9, which entire torque is therefore directly proportional to the supporting torque which is provided by the additional drive unit 5. The proportion of the torque which is supplied by the additional drive unit 5 is dependent on the fixed-carrier transmission ratio of the first transmission part region 4.

Therefore, by way of the provided torque, the additional drive unit 5 controls the entire torque which is output at the rear axle 9. The distribution of torque can be set in a fully variable manner for all driving situations as a result.

LIST OF DESIGNATIONS

1 Transmission arrangement
2 Input element
3 Output element
3' First half axle (of the rear axle)
3" Second half axle (of the rear axle)
4 First transmission part region
5 Additional drive unit
6 Second transmission part region
7 Differential cage
8 Planetary gear carrier
9 Rear axle
10 Front axle
11 Main drive unit
12 Main transmission
13 Torque-transmitting element
14, 14' Rear wheel
15 Internal gear
16, 16' Planetary gear
17 Sun gear
18, 18' Compensating bevel gear
19, 19' Axle bevel gear

The invention claimed is:

1. A transmission arrangement for the controllable distribution of drive torque from an input element to at least one output element, comprising a first transmission part region, namely a planetary gear mechanism, and an additional drive unit, an internal gear of the first transmission part region being drive-connected directly to the input element, and a sun gear of the first transmission part region being drive-connected directly to an output of the additional drive unit, and the first transmission part region being drive-connected directly or indirectly to the output element.

2. The transmission arrangement as claimed in claim 1, wherein the first transmission part region is drive-connected indirectly via a second transmission part region, namely a differential transmission, to the output element.

3. The transmission arrangement as claimed in claim 1, wherein the additional drive unit is arranged offset in parallel to the output element.

4. The transmission arrangement as claimed in claim 1, wherein the additional drive unit is arranged coaxially with respect to the output element.

5. The transmission arrangement as claimed in claim 1, wherein the first transmission part region is configured as a multi-step planetary gear mechanism.

6. The transmission arrangement as claimed in claim 1, wherein the transmission arrangement is arranged on a rear axle of an all-wheel-drive motor vehicle, the rear axle being the output element.

7. A transmission arrangement for the controllable distribution of drive torque from an input element to at least one output element, comprising a first transmission part region, namely a planetary gear mechanism, and an additional drive unit, the first transmission part region being drive-connected directly or indirectly to the input element and to the additional drive unit, and the first transmission part region being drive-connected directly or indirectly to the output element,
wherein the first transmission part region is drive-connected indirectly via a second transmission part region, namely a differential transmission, to the output element, and
wherein the differential transmission has a differential cage, the differential cage forming a planetary gear carrier of the first transmission part region.

* * * * *